(12) United States Patent
Ottesen et al.

(10) Patent No.: US 6,608,727 B2
(45) Date of Patent: Aug. 19, 2003

(54) METHOD AND APPARATUS FOR DETERMINING THE TRIBOLOGY FOR A HEAD/DISK INTERFACE

(75) Inventors: Hal Hjalmar Ottesen, Rochester, MN (US); Gordon James Smith, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 344 days.

(21) Appl. No.: 09/772,266
(22) Filed: Jan. 29, 2001

(65) Prior Publication Data
US 2002/0141090 A1 Oct. 3, 2002

(51) Int. Cl.[7] .............................. G11B 27/36; G11B 5/09
(52) U.S. Cl. .......................................... 360/31; 360/46
(58) Field of Search ............................... 360/31, 25, 46, 360/75, 246.2; 428/65.3, 65.4; 324/210; 356/507

(56) References Cited

U.S. PATENT DOCUMENTS 5,859,358 A * 1/1999 Wood et al. ...................... 73/9
6,957,021 * 5/2000 Ishikawa et al. ............ 428/65.3
6,359,433 B1 * 3/2002 Gillis et al. .................. 324/210
2001/0008476 A1 * 7/2001 Imamura .................. 360/246.2

OTHER PUBLICATIONS

"Digital Signal Processing—A Computer–Based Approach" by S. K. Mitra, McGraw–Hill, 1998, pp. 520–523.

* cited by examiner

Primary Examiner—Regina N. Holder
(74) Attorney, Agent, or Firm—James R. Nock; Joan Pennington

(57) ABSTRACT

A method and apparatus are provided for determining the tribology for a head/disk interface in a direct access storage device (DASD). A readback signal is obtained from a predetermined cylinder. The readback signal is sampled to provide a readback sampled sequence. The readback sampled sequence is summed to store a sum for each data sector of a plurality of data sectors in said predetermined cylinder. Predetermined discrete Fourier transform (DFT) magnitude components are calculated for the data sector sums. A harmonic ratio is calculated utilizing the calculated predetermined DFT magnitude components. The calculated harmonic ratio is compared with a predefined threshold value to identify the tribology for a head/disk interface.

20 Claims, 4 Drawing Sheets

METHOD AND APPARATUS FOR DETERMINING THE TRIBOLOGY FOR A HEAD/DISK INTERFACE

FIELD OF THE INVENTION

The present invention relates generally to the data processing field, and more particularly, relates to a method and apparatus for determining the tribology for a head/disk interface.

DESCRIPTION OF THE RELATED ART

Modern disk drives are becoming more sophisticated with lower flyheight, higher areal recording densities, and faster rotational spindle velocities. The lower flyheight requires more information about the tribology of the many head/disk interfaces in the disk drive. This information generally must be obtained in an in-situ way and must be computational tractable within the onboard computing facilities of the disk drive.

A need exists for an improved method and apparatus for determining the tribology for a head/disk interface.

As used in the present specification and claims, the term transducer head should be understood to include a slider with an attached write head and read head, such as a MR head. Typically, the MR head element is recessed and a rear pad of the slider makes the contact with a disk surface. As used in the present specification and claims, the term cylinder should be understood to mean a track.

SUMMARY OF THE INVENTION

A principal object of the present invention is to provide a method and apparatus for determining the tribology for a head/disk interface. Other important objects of the present invention are to provide such method and apparatus for determining the tribology for a head/disk interface substantially without negative effect and that overcome many of the disadvantages of prior art arrangements.

In brief, a method and apparatus are provided for determining the tribology for a head/disk interface in a direct access storage device (DASD). A readback signal is obtained from a predetermined cylinder. The readback signal is sampled to provide a readback sampled sequence. The readback sampled sequence is summed to store a sum for each data sector of a plurality of data sectors in said predetermined cylinder. Predetermined discrete Fourier transform (DFT) components are calculated for the data sector sums. A harmonic ratio is calculated utilizing the calculated predetermined DFT components. The calculated harmonic ratio is compared with a predefined threshold value to identify the tribology for a head/disk interface.

In accordance with features of the invention, each of a plurality of predetermined heads is sequentially positioned on each of a plurality of predetermined cylinders for obtaining a readback signal. A plurality of predefined threshold values are provided for the plurality of predetermined heads and the plurality of predetermined cylinders. Zeroth and first discrete Fourier transform (DFT) components are calculated for the data sector sums. The harmonic ratio is calculated by dividing the magnitude of the zeroth DFT component by the magnitude of the first DFT component.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
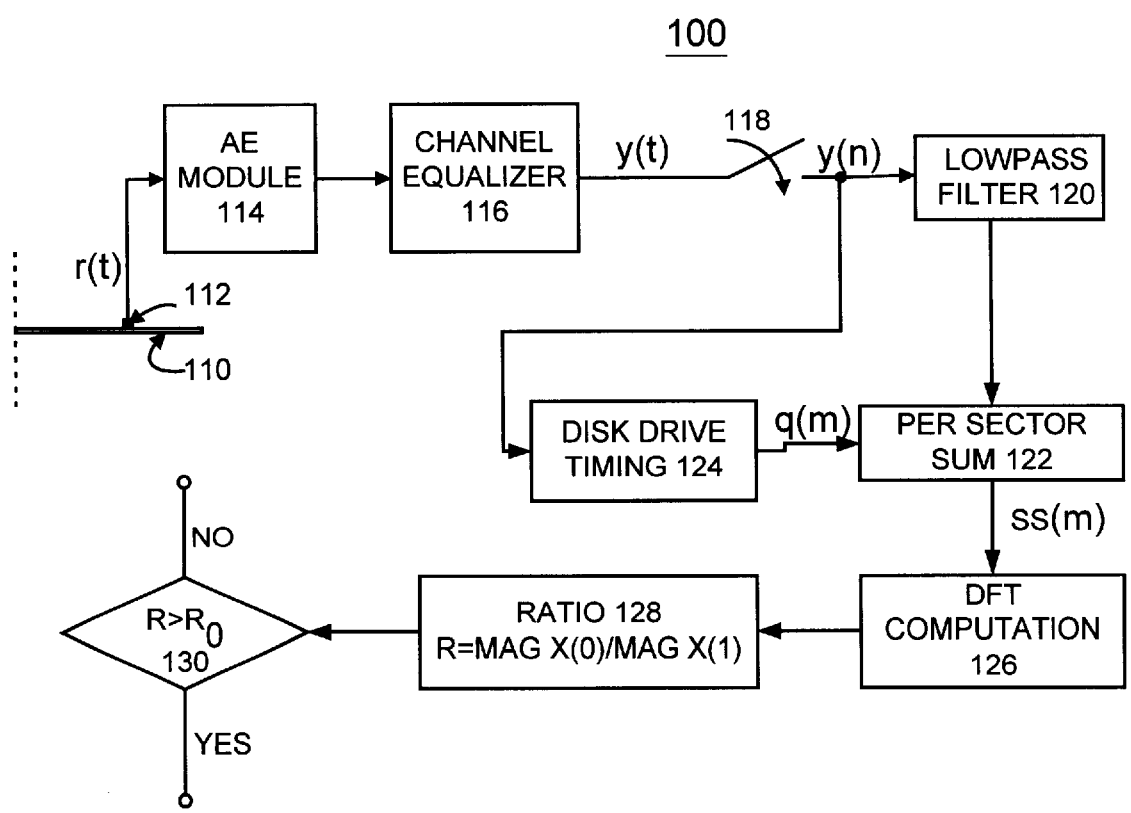
FIG. 1 is a block diagram representation illustrating a direct access storage device (DASD) for implementing methods for determining the tribology for a head/disk interface in accordance with the preferred embodiment.

Having reference now to the drawings, in FIG. 1, there is shown a direct access storage device (DASD) for implementing methods for determining the tribology for a head/disk interface in accordance with the preferred embodiment generally designated by the reference character 100. As shown in FIG. 1, direct access storage device (DASD) 100 includes a recorded disk 110 that is spun at constant speed and a transducer head 112, such as a MR head 112 that is positioned on a given track for reading information stored on that track. Assume that a disk drive 100 has N sectors per track, with each sector comprising a servo-burst sector and data sector. The head 112 is positioned over an erased track on one of the surfaces of the disk 110. A readback signal r(t) from the MR head 112 is operated at some bias current. The readback signal r(t) is now due to thermal activity between the MR head and the disk surface 110.

In accordance with features of the preferred embodiment, a simple and computationally efficient method is provided to determine the tribology of a head/disk interface by using the thermal component of the MR readback signal. The method averages the readback signal from an erased track within each of N data sectors. A harmonic magnitude ratio R of the DC component, X(0), and the first harmonic component X(1) is a measure of the amount of tangential jitter present at the head/disk interface. A large value for R indicates a sound, well-lubricated interface, while a low value of R indicates a cause for concern about the durability of that head/disk interface.

The readback signal r(t) is amplified by and highpass-filtered by an arm electronic (AE) module 114, and its filtered output is bandpass-filtered through a channel equalizer 116. An equalized channel equalizer output y(t) is sampled by an analog-to-digital converter (A/D) 118 to provide a discrete-time digital sequence y(n). The sampled sequence y(n) is optionally filtered by a low pass filter 120. A gated accumulator 122 sums the filtered or non-filtered samples obtained from each data sector and stores the N individual sums. The accumulator 122 is gated by a timing signal q(m) derived from the readback signal by a disk drive timing unit 124, such that only the samples within each data sector are summed. The result is a summation sequence SS(m), m=1, 2, . . . , N, of length N containing the sums of the filtered readback signals from each data sector of the specified track. Individual components of the discrete Fourier transform DFT, such as the magnitude of the zeroth harmonic component X(0), and the magnitude of the first harmonic component X(1), are computed in a DFT computation block 126.

Computation of the zeroth harmonic component X(0) is very simple, since it is the total sum of the x(m) sequence.

The first harmonic component X(1) is computed using, for example, Goertzel's method. Goertzel's algorithm is an elegant, recursive method with low computational requirements, that computes only one harmonic frequency component at a time. Goertzel's algorithm is described in "DIGITAL SIGNAL PROCESSING-A COMPUTER-BASED APPROACH" by S. K. Mitra, McGraw-Hill, 1998, pp. 520–523. The computation of both the harmonic components X(0) and X(1) is simplified since all data terms are real with no complex terms.

A harmonic ratio, R, which is the ratio of the absolute value of the magnitudes of X(0) and X(1) is calculated at a ratio calculation block 128. The harmonic ratio, R, is a measure of the MR head's low frequency thermal activity or low frequency flyheight variation. The flyheight conditions are assessed at a decision block 130. The harmonic ratio, R calculated at block 128 is compared with a predetermined threshold value $R_0$ at decision block 130. If the harmonic ratio R is greater than the predetermined threshold value $R_0$ then the flyheight/tribology is adequate. Otherwise if the harmonic ratio R is less than the predetermined threshold value $R_0$ then there is cause for concern. A large value for the harmonic ratio R suggests a sound, well-lubricated interface, while a low value of the harmonic ratio R may be cause for concern for the lubricity or durability of that interface.

The harmonic ratio R is not dependent on the absolute value of the magnitudes of the harmonic components. The harmonic ratio R is self-normalized. The first harmonic component occurs at a frequency of f1=RPM/60 Hz, where RPM is the rotational spindle velocity in revolutions per minute. For example, if the spindle velocity is 10,000 RPM with N=90 sectors per track, then the first harmonic frequency f1=166.67 Hz, and the sampling frequency for the DFT computation in block 126 is fs=N*RPM/60 =15,000 Hz.

Figure 2A:
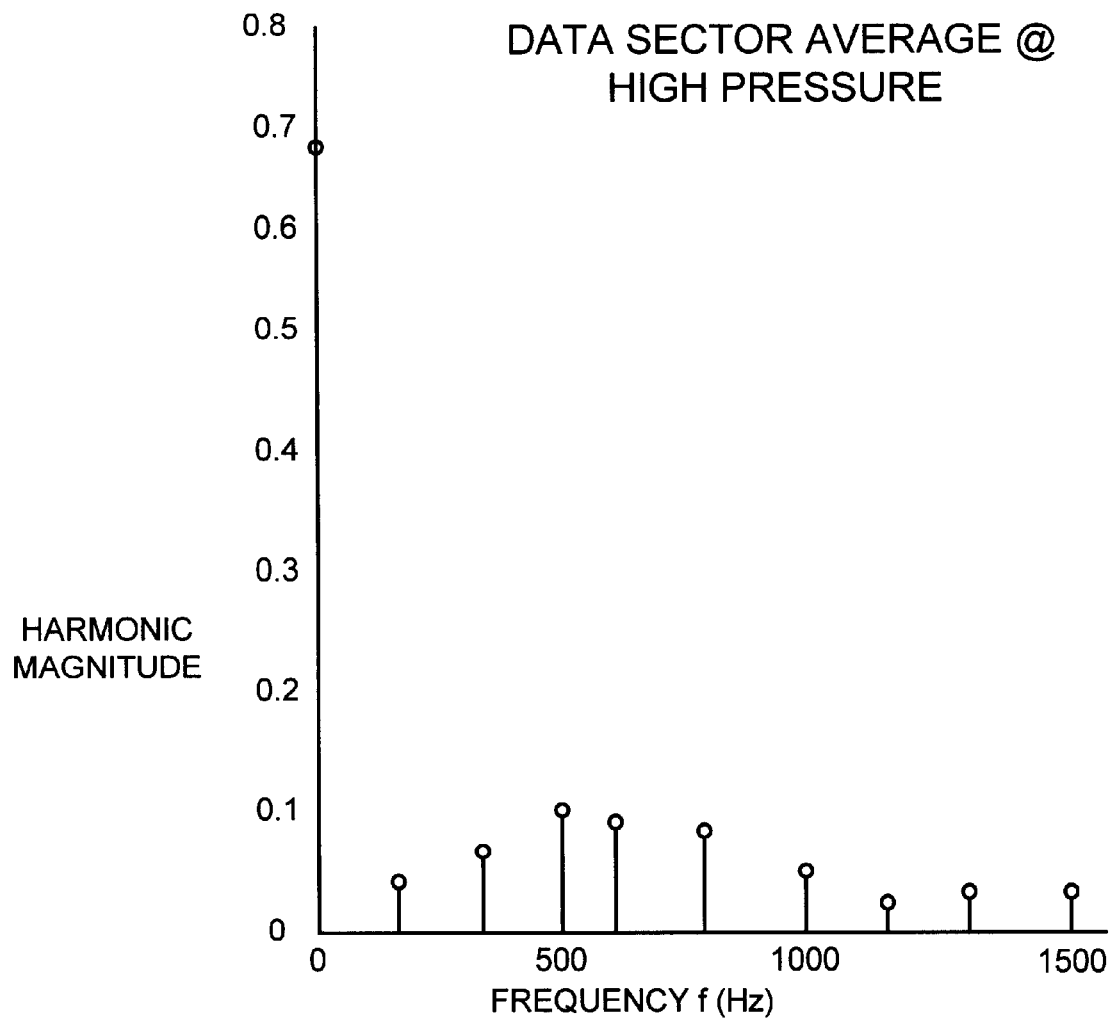
FIGS. 2A and 2B are charts illustrating exemplary experimental results with harmonic magnitude shown along the vertical axis and frequency shown along the horizontal axis.
Figure 2B:
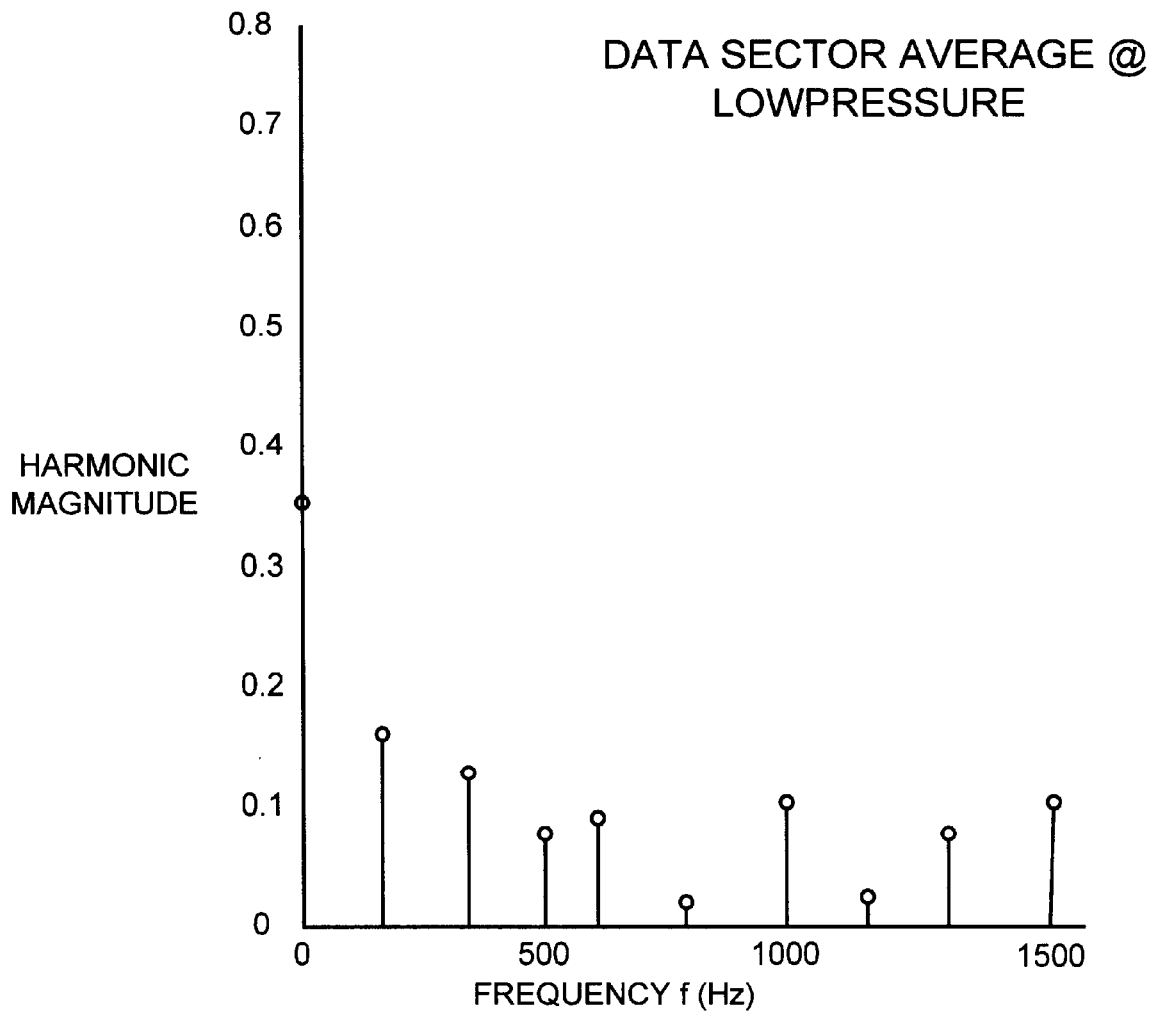

Referring to FIGS. 2A and 2B and to the following Table 1, there are shown experimental results in accordance with the preferred embodiment. An experiment was performed using a disk drive which has a spindle rotational speed of 10,000 RPM and uses 90 servo sectors. Head 0 was selected as track-following on cylinder or track 20 at two different pressures, high pressure (ambient)=721 Torr as shown in FIG. 2A and low pressure=380 Torr as shown in FIG. 2B. Track 20 and its two adjacent tracks, 19 and 21, were DC erased. The readback signal, r(t), is thus primarily dependent on the thermal signal component. The readback signal, r(t), is for one revolution was lowpass filtered with a lowpass cutoff frequency of 1 MHz. The readback signal for each data sector was summed and then stored in a sequence x(m) at block 122. The magnitudes of the zeroth and first harmonic of the Discrete Fourier Transform (DFT) were computed and the harmonic ratios R were calculated at blocks 126 and 128. Results are shown in FIGS. 2A and 2B and to the following Table 1.

TABLE 1

Harmonic Analysis of Data-Sector Thermal Average at Two Pressures

| Component | High Pressure (721 Torr) | Low Pressure (380 Torr) |
|---|---|---|
| X(0) | −0.6688 | −0.3494 |
| IX(0)I | 0.6688 | 0.3494 |
| IX(1)I | 0.0404 | 0.1459 |
| R | 16.536 | 2.3941 |

The experimental results given in Table 1 show a remarkable change in the thermal signal-component magnitudes for the low frequency harmonic content. The change is due to the head flying lower at the lower pressure and thereby causing more intermittent head/disk contacts. The intermittent head/disk contacts set up more low-frequency (100–300 Hz) activity in the thermal signal. This can be seen as low-frequency variations in the thermal transfer between the head and disk, which is synonymous to low-frequency variations in the head-to-disk flyheight. From the ratios in Table 2, it can be seen that a change from a nominal to a low flying height condition can be easily detected as an increase in the thermal harmonic ratio R. Table 1 shows that the ratio R at the high pressure is seven times larger than the ratio R at the low pressure.

It can be seen that the ratio R is an effective way to detect the flyheight or lubricity of a head/disk interface. Low flyheight will naturally decrease the value of the thermal harmonic ratio R due to the increase in low-frequency activity. If the disk surface lubricity is also low, then the thermal low-frequency activity will increase even further and reduce the ratio R even more.

In order to demonstrate the consistency of the measurement in accordance with the preferred embodiment, a full set of measurements was performed. These measurements included all heads, at both the high and low pressures, at cylinder 20 (outer disk diameter) and at cylinder 11700 (inner disk diameter). The following Table 2 provides a summary of the results for these measurements. It is apparent that all heads behave in a similar manner. At the lower pressure, the ratio R decreases. The decrease is driven by the large increase in the X(0). The increase in X(0) at lower pressure is caused by additional frictional heating. In Table 2 the magnitudes of X(0) and X(1) are shown and respective ratios, R.

TABLE 2

10,000 RPM, Low Pressure = (380 Torr) High pressure = (720 Torr), 90 Sectors, OD = 20, ID = 11700 Track adjacent DC erased

| Head | Cylinder | Pressure | IX(0)I | IX(1)I | R |
|---|---|---|---|---|---|
| 0 | OD | Low | 36.6296 | 17.8752 | 2.0492 |
|   |    | High | 344.7778 | 15.4062 | 22.3792 |
| 0 | ID | Low | 75.3838 | 4.8907 | 15.4137 |
|   |    | High | 208.9394 | 3.3494 | 62.3811 |
| 1 | OD | Low | 22.2828 | 25.3892 | 1.4480 |
|   |    | High | 292.9764 | 7.4165 | 39.5032 |
| 1 | ID | Low | 15.6633 | 15.0283 | 1.0423 |
|   |    | High | 142.8889 | 10.3868 | 13.7568 |
| 2 | OD | Low | 47.0808 | 16.0561 | 2.9323 |
|   |    | High | 20.7172 | 9.2934 | 2.2292 |
| 2 | ID | Low | 87.3367 | 10.5423 | 8.2844 |
|   |    | High | 130.1448 | 4.1760 | 31.1652 |
| 3 | OD | Low | 22.3973 | 10.0862 | 2.2206 |
|   |    | High | 196.4478 | 20.0940 | 9.7765 |
| 3 | ID | Low | 12.8754 | 1.0435 | 12.3392 |
|   |    | High | 120.2862 | 9.8197 | 12.2494 |
| 4 | OD | Low | 49.0438 | 10.5793 | 4.6358 |
|   |    | High | 232.9226 | 13.7298 | 16.9648 |
| 4 | ID | Low | 27.2795 | 11.0391 | 2.4712 |
|   |    | High | 74.6869 | 22.1237 | 3.3759 |

Figure 3:
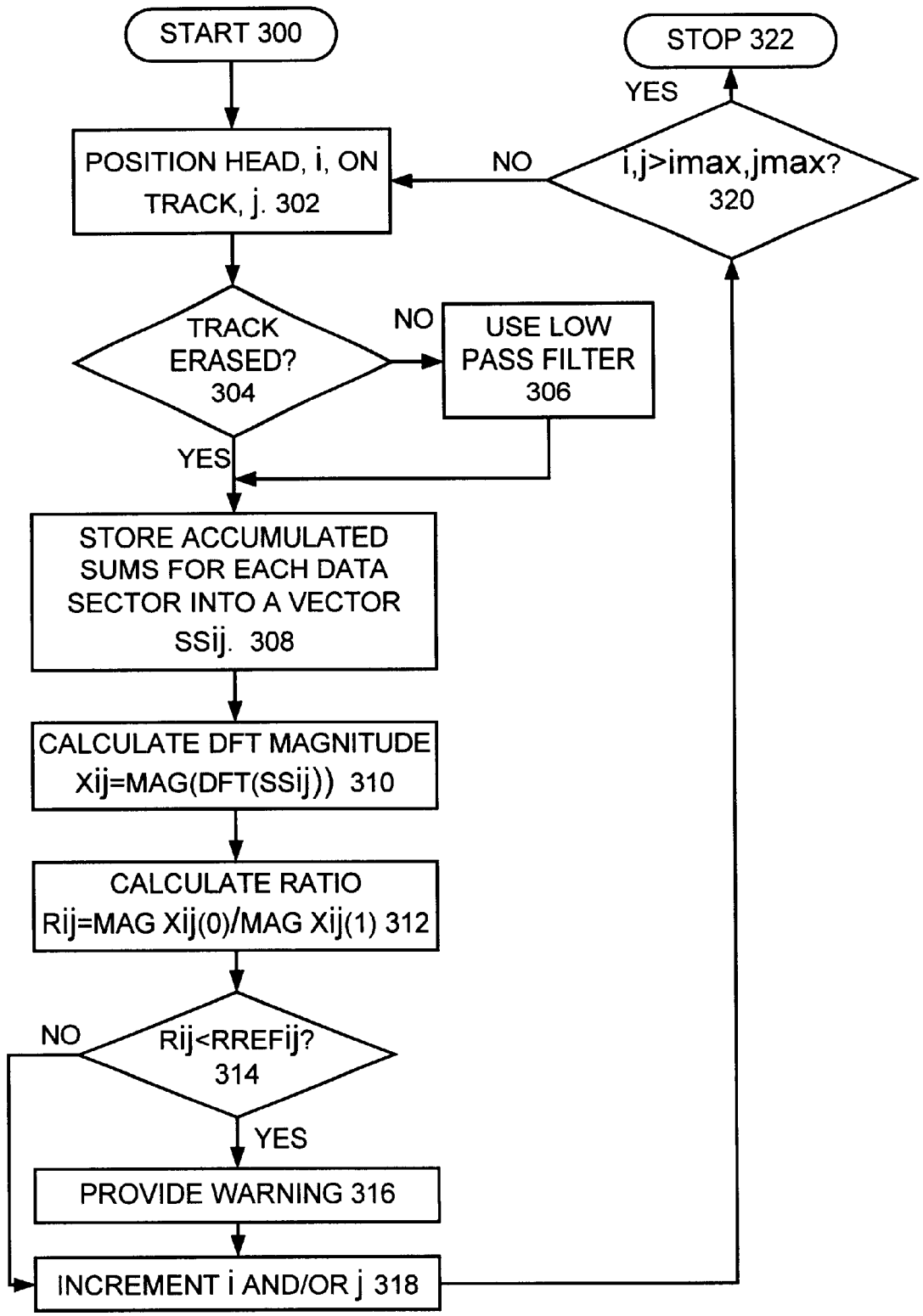
FIG. 3 is a flow chart illustrating exemplary steps for determining the tribology for a head/disk interface in accordance with the preferred embodiment.

Referring now to FIG. 3, there are shown exemplary steps for determining the tribology for a head/disk interface in accordance with the preferred embodiment starting at block 300. A head, i is positioned on a predefined track, j as indicated in a block 302. Checking whether the track is erased is performed as indicated in a decision block 304. When the track is not erased, then a low pass filter is used as indicated in a block 306. Otherwise, when the track is erased, then accumulated sums for each data sector are stored into a vector, SSij as indicated in a block 308. Next the discrete Fourier transform (DFT) is calculated as indicated in a block 310 labeled Xij=MAG(DFT(SSij)). The ratio Rij is calculated as indicated in a block 312 and labeled Rij=MAG Xij(0)/MAG Xij(1). The calculated ratio Rij is compared with a predetermined threshold value RREFij for the head i and track j as indicated in a decision block 314. When the calculated ratio Rij is less than the predetermined threshold value RREFij, then a warning is provided as indicated in a block 316. Otherwise when the calculated ratio Rij is greater than the predetermined threshold value RREFij, then the head i and/or track j are incremented as indicated in a block 318. Then the current head i are current track j are compared with predefined maximum values imax, jmax as indicated in a decision block 320. If the current head i are current track j are less than or equal to the predefined maximum values then the sequential operations return to block 302 to position the current head i on current track j. Otherwise the sequential operations end as indicated in a block 322.

While the present invention has been described with reference to the details of the embodiments of the invention shown in the drawing, these details are not intended to limit the scope of the invention as claimed in the appended claims.

What is claimed is:

1. A method for determining the tribology for a head/disk interface in a direct access storage device (DASD) comprising the steps of:

obtaining a readback signal from a predetermined cylinder;

sampling said readback signal to provide a readback sampled sequence;

summing said readback sampled sequence to store a sum for each data sector of a plurality of data sectors in said predetermined cylinder;

calculating predetermined discrete Fourier transform (DFT) magnitude components for said data sector sums;

calculating a harmonic magnitude ratio utilizing said calculated predetermined DFT magnitude components; and comparing said calculated harmonic magnitude ratio with a predefined threshold value to identify the tribology for a head/disk interface.

2. A method for determining the tribology for a head/disk interface in a direct access storage device (DASD) as recited in claim 1 wherein said step of obtaining a readback signal from a predetermined cylinder includes the step of using a predetermined head and positioning said predetermined head on said predetermined cylinder for obtaining said readback signal.

3. A method for determining the tribology for a head/disk interface in a direct access storage device (DASD) as recited in claim 2 wherein said step of using a predetermined head and positioning said predetermined head on said predetermined cylinder for obtaining said readback signal includes the steps of sequentially positioning said predetermined head on a plurality of predetermined cylinders for obtaining said readback signal from each of said plurality of predetermined cylinders, said plurality of predetermined cylinders including an inner cylinder and an outer cylinder.

4. A method for determining the tribology for a head/disk interface in a direct access storage device (DASD) as recited in claim 2 wherein said step of using a predetermined head and positioning said predetermined head on said predetermined cylinder for obtaining said readback signal includes the steps of sequentially using each of a plurality of predetermined heads for obtaining said readback signal with each of said plurality of predetermined heads sequentially positioned on said predetermined cylinder.

5. A method for determining the tribology for a head/disk interface in a direct access storage device (DASD) as recited in claim 4 wherein said step of sampling said readback signal to provide a readback sampled sequence includes the step of using an analog-to-digital, sampling said filtered readback signal to provide said readback sampled sequence.

6. A method for determining the tribology for a head/disk interface in a direct access storage device (DASD) as recited in claim 1 wherein said step of obtaining a readback signal from a predetermined cylinder includes the step of bandpass filtering said readback signal.

7. A method for determining the tribology for a head/disk interface in a direct access storage device (DASD) as recited in claim 1 wherein said step of calculating predetermined discrete Fourier transform (DFT) magnitude components for said data sector sums includes the steps of calculating a zeroth discrete Fourier transform (DFT) magnitude component and a first discrete Fourier transform (DFT) magnitude component for said data sector sums.

8. A method for determining the tribology for a head/disk interface in a direct access storage device (DASD) as recited in claim 7 wherein said step of calculating a harmonic magnitude ratio utilizing said calculated predetermined DFT magnitude components includes the step of calculating a harmonic magnitude ratio utilizing said zeroth discrete Fourier transform (DFT) magnitude component and said first discrete Fourier transform (DFT) magnitude component for said data sector sums.

9. A method for determining the tribology for a head/disk interface in a direct access storage device (DASD) as recited in claim 8 wherein said step of calculating said harmonic magnitude ratio utilizing includes the step of dividing said zeroth discrete Fourier transform (DFT) magnitude component by said first discrete Fourier transform (DFT) magnitude component.

10. A method for determining the tribology for a head/disk interface in a direct access storage device (DASD) as recited in claim 1 wherein said step of comparing said calculated harmonic magnitude ratio with a predefined threshold value to identify the tribology for a head/disk interface includes the step of generating a warning responsive to said calculated harmonic magnitude ratio being less that said predefined threshold value.

11. A method for determining the tribology for a head/disk interface in a direct access storage device (DASD) as recited in claim 1 wherein said step of comparing said calculated harmonic magnitude ratio with a predefined threshold value to identify the tribology for a head/disk interface includes the step of providing a plurality of predefined threshold values, each of said plurality of predefined threshold values is selectively provided for a predetermined head.

12. A method for determining the tribology for a head/disk interface in a direct access storage device (DASD) as recited in claim 1 wherein said step of comparing said calculated harmonic magnitude ratio with a predefined threshold value to identify the tribology for a head/disk interface includes the step of providing a plurality of predefined threshold values, each of said plurality of predefined threshold values is selectively provided for a predetermined cylinder.

13. Apparatus for determining the tribology for a head/disk interface in a direct access storage device (DASD) comprising:

a head for obtaining a readback signal from a predetermined cylinder of a data surface;

an analog-to-digital for sampling said readback signal to provide a readback sampled sequence;

an accumulator for summing said readback sampled sequence to store a sum for each data sector of a plurality of data sectors in said predetermined cylinder;

a discrete Fourier transform (DFT) calculator for calculating predetermined discrete Fourier transform (DFT) magnitude components for said data sector sums;

a ratio calculator for calculating a harmonic ratio utilizing said calculated predetermined DFT magnitude components; and a decision block for comparing said calculated harmonic ratio with a predefined threshold value to identify the tribology for a head/disk interface.

14. Apparatus for determining the tribology for a head/disk interface in a direct access storage device (DASD) as recited in claim 13 wherein said decision block for generating a warning responsive to said calculated harmonic ratio being less that said predefined threshold value.

15. Apparatus for determining the tribology for a head/disk interface in a direct access storage device (DASD) as recited in claim 13 wherein said discrete Fourier transform (DFT) calculator for calculating zeroth and first discrete Fourier transform (DFT) magnitude components for said data sector sums.

16. Apparatus for determining the tribology for a head/disk interface in a direct access storage device (DASD) as recited in claim 15 wherein said ratio calculator for calculating a harmonic ratio utilizing said calculated zeroth and first DFT magnitude components.

17. Apparatus for determining the tribology for a head/disk interface in a direct access storage device (DASD) as recited in claim 15 wherein said ratio calculator for calculating a harmonic ratio by dividing said calculated zeroth DFT magnitude component by said calculated first DFT magnitude component.

18. Apparatus for determining the tribology for a head/disk interface in a direct access storage device (DASD) as recited in claim 13 includes a channel equalizer for bandpass filtering said readback signal and wherein said analog-to-digital samples said filtered readback signal to provide said readback sampled sequence.

19. Apparatus for determining the tribology for a head/disk interface in a direct access storage device (DASD) as recited in claim 13 wherein said accumulator for summing said readback sampled sequence to store a sum for each data sector of a plurality of data sectors in said predetermined cylinder is gated by a timing signal derived from said readback signal.

20. Apparatus for determining the tribology for a head/disk interface in a direct access storage device (DASD) as recited in claim 13 includes a low pass filter for low pass filtering said readback signal.

\* \* \* \* \*